US007398474B2

(12) United States Patent
Yan et al.

(10) Patent No.: US 7,398,474 B2
(45) Date of Patent: Jul. 8, 2008

(54) METHOD AND SYSTEM FOR A DIGITAL DEVICE MENU EDITOR (75) Inventors: Xin Yan, Bellevue, WA (US); Keira Amos, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 536 days.

(21) Appl. No.: 11/047,235

(22) Filed: Jan. 31, 2005

(65) Prior Publication Data

US 2006/0174215 A1 Aug. 3, 2006

(51) Int. Cl.
G06F 13/00 (2006.01)
G06F 15/00 (2006.01)

(52) U.S. Cl. .................... 715/763; 715/700; 715/765

(58) Field of Classification Search ................. 715/700, 715/763, 765, 851, 853, 854, 852
See application file for complete search history.

(56) References Cited

U.S. PATENT DOCUMENTS

2002/0085020 A1* 7/2002 Carroll, Jr. .................. 345/700
2004/0027377 A1   2/2004 Hays et al.
2004/0133848 A1* 7/2004 Hunt et al. .................. 715/500
2005/0097462 A1* 5/2005 Lumera et al. .............. 715/522
2005/0213763 A1* 9/2005 Owen et al. ................. 380/270

OTHER PUBLICATIONS

Sun Microsystems, User's Guide, Wireless Toolkit, Dec. 2003, Java 2 Platform, Micro Edition, 90 pages, XP 002325476.
Jones, B.L., "Mobile/PocketPC Development Jump Start", Internet Citation, http://www.developer.com, Jul. 9, 2004, 6 pages.

* cited by examiner

Primary Examiner—Cao (Kevin) Nguyen
(74) Attorney, Agent, or Firm—Woodcock Washburn LLP (57) ABSTRACT A method of creating a menu for a handheld digital device in a development environment includes selecting a target device which has an associated operating system available to the development environment. An editor is called for creation of the menu. The editor uses the constraints of the associated target device operating system so that actual behavior of the target device can be viewed as the development occurs. The developer defines functionality for the menu and can verify its operation. The menu editor can be customized for new digital devices with new operating system. Code may be generated as a result of completing the development process and saving the design. The resulting code is assured to run properly on the target device operating system.

13 Claims, 7 Drawing Sheets

Fig. 7

METHOD AND SYSTEM FOR A DIGITAL DEVICE MENU EDITOR

CROSS REFERENCE TO RELATED APPLICATIONS

This application shares some subject matter with co-owned U.S. patent application Ser. No. 10/922,580, filed Aug. 20, 2004, entitled "Form Skin And Design Time WYSIWYG For .Net Compact Framework" and is incorporated herein by reference in its entirety.

FIELD OF THE INVENTION

The invention relates to the field of computer programming. More specifically, the invention relates to visual programming environments for creating software designed to run on target digital devices.

BACKGROUND OF THE INVENTION

An increasing number of portable computer devices are available in the market. These devices include handheld or pocket sized computers, phones and personal digital assistants of various form factors and capabilities. As the computing power and memory capabilities of the handheld devices increase, users are demanding access to more powerful software applications.

Given the multitude of variations of interfaces, screen sizes, and resolutions among the handheld devices, it can be very difficult for a programmer to ensure that a particular chosen graphical user interface (GUI) of the handheld will appear and work correctly on multiple devices. For example, the display and functionality of the target handheld device is often not well reflected in the capabilities of the development system.

Typically, programmers of handheld devices alternate between first programming on a desktop development system and then running the newly developed software on an emulator of the handheld device, or the actual device, to see if the handheld GUI operates as expected. This can be time consuming and inefficient, especially if a programmer wishes to port the application to a wide variety of portable devices. In one aspect of programming, the typical development environment may allow a handheld device programmer to generate a function, such as a handheld menu, which cannot be realized in a controllable fashion in the target handheld device.

Thus, there is a need for a "what you see is what you get" (WYSIWYG) development system for a handheld device which properly emulates the target handheld device such that the software look and feel of the target handheld device can be emulated on a single development system. It would also be advantageous if the development system could be extensible so that it can work with future devices. The present invention addresses the aforementioned needs and solves them with additional advantages as expressed herein.

SUMMARY OF THE INVENTION

A menu editor is an important element for application developers of target digital devices. One desirable aspect of a menu editor includes accurately representing the runtime look and feel of a menu as the menu would be seen on a target device. Another desirable aspect of a menu editor is that the code generated by a development system be fully compatible with the target device. Another desirable aspect of a menu editor is that it be extensible for future devices regardless of the operating system used in the target device.

In one aspect of the current invention, the menu editor ensures object code for the developed feature is generated that is fully compatible with the specific operating system of the target device. The final code runs on the target device in the same manner as the new feature was displayed on the development system. In a further aspect of the invention, a developed feature, such as a menu, can be defined addressing one target device and then changed to accommodate another handheld device thus allowing feature design re-use. In another aspect of the invention, the menu editor is extensible to include the development of menu items for future generations of new digital devices.

BRIEF DESCRIPTION OF THE DRAWINGS

The foregoing summary, as well as the following detailed description of exemplary embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

In one embodiment of the invention, a menu editor for a handheld digital device is realized that is a software application finding utility on a development system. The development system is used by handheld device developers for the generation of new applications for handheld digital devices. These developers may be modifying or making new applications using the graphical user interface of the handheld device using a pre-existing operating system or using a custom made operating system for the handheld device.

One advantage of the present invention is the ability of the user/developer to view the entire handheld device and the response of the handheld device as she is generating new menu functionality. The use of the target device operating system allows the developer to immediately see how the target operating system responds to new menus as they are being developed. This saves both total development and debug time. Another advantage of the present menu editor system is that it is extensible and can be customized for different devices, including future devices. Although examples of target digital devices included herein include handheld digital devices, the present invention is suitable for any embedded device application having a menu item. Examples of such embedded device applications include, but are not limited to, non-handheld devices such as airline kiosks, gas pumps, cash registers, telephone or other telecommunications system displays.

Exemplary Embodiments of the Invention

Figure 1:
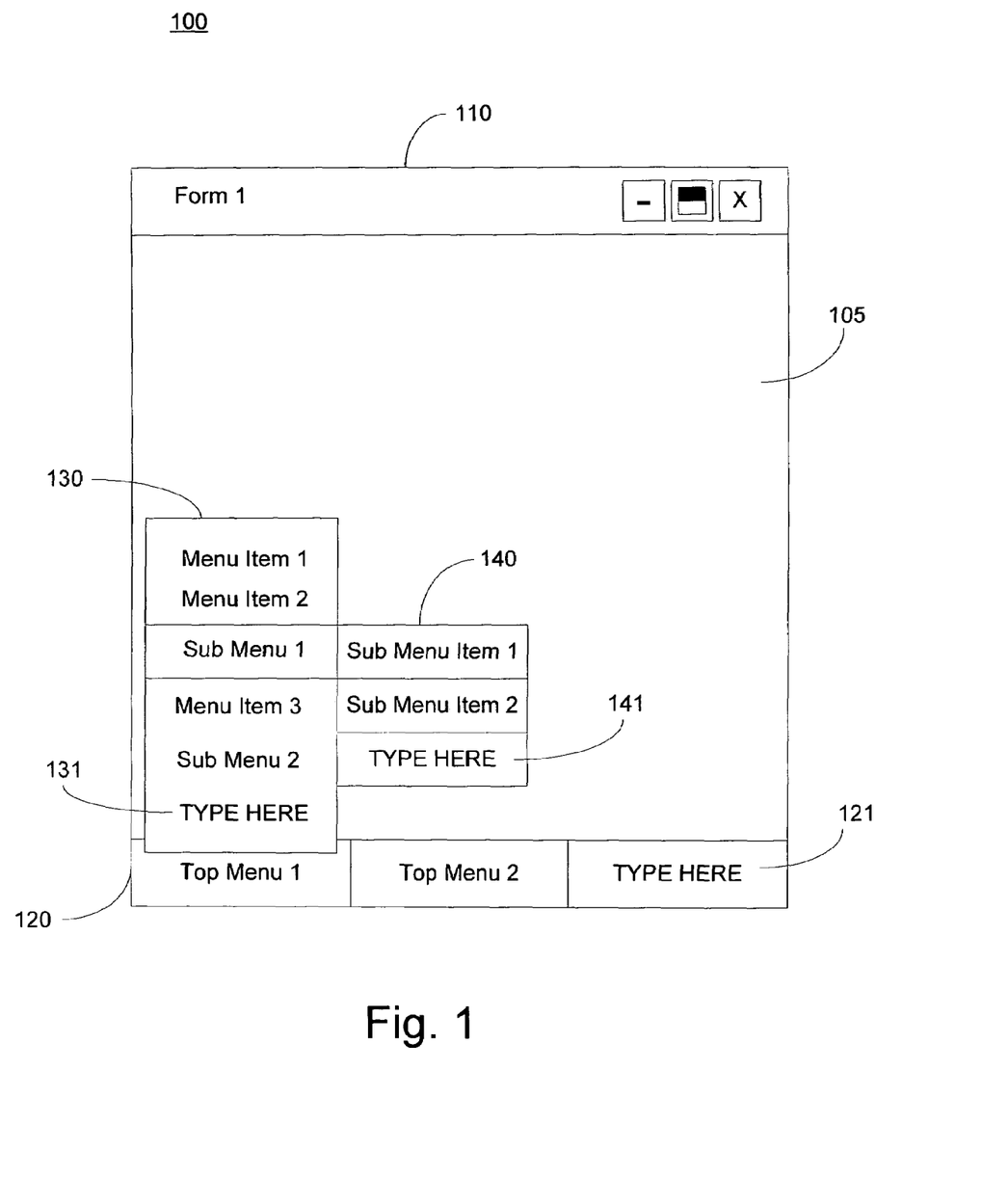
FIG. 1 is an exemplary screen shot of a development system showing aspects of the invention.

FIG. 1 is a depiction of a software development system partial screen shot 100 showing aspects of the invention. In this embodiment, a representative form of the graphical user interface (GUI) of the handheld target device 110 is rendered on a monitor of a development system. The developer thus has the opportunity to see the GUI of the target device as she is creating new menu features for the device. The handheld device may be any one of a portable phone, a personal digital assistant, a portable computer, a GPS receiver processor, an inventory tracking device, a portable point of sale device or any other handheld device having a GUI.

In the embodiment of FIG. 1, the main menu bar 120 is located on the bottom of the handheld device screen 105. At the present stage of development for this target device GUI 110, the main menu 120 indicates that there are two established main menu items or softkeys; top menu 1 and top menu 2. As an aspect of the invention, if the operating system of the target handheld device can support an expansion of the main menu 120 softkeys, then an additional menu item space 121 is provided for the developer to type a label to identify the softkey and define one or more functions to be performed upon actuation of the softkey.

The embodiment of FIG. 1 indicates that the developer has navigated through multiple menu items on the handheld device GUI. The developer has selected the top menu 1 item of the main menu bar 120. The resulting function of the selection of the top menu 1 softkey is the display of the menu items drop down list 130. The menu items list includes menu items 1 through 3 and submenu 1 and 2. In the embodiment of FIG. 1, menu items 1-3 and submenu 1 and 2 are already labeled by the developer and may or may not yet have functions associated with them. In one aspect of the invention, an additional menu item 131 may be labeled by the developer and the newly defined menu item defined according to a desired function. In one embodiment of the invention, the total number of new menu items, such as item 131 in menu item list 130 is limited by the size of the linear display. This limitation is presented in the development system as a default so that the developer can experience the actual limitation of the handheld device GUI as she is developing software.

In the embodiment of FIG. 1, the developer has selected submenu 1 which displays a lower tier menu stack 140 showing submenu items 1 and 2. Note that not all menu items in stack 130 have lower tier submenu items. For example, menu item 1 of stack 130 may perform a paste function whereas submenu 1 may be an import function where the sources of an import is selectable as a multiplicity of submenu items 1 and 2 that are shown in stack 140. In one aspect of the invention, if the handheld device operating system allows the expansion of the lower tier stack 140 to include more submenu items, then the development system may depict that ability by displaying a position of a next available menu item 141. In the embodiment of FIG. 1, the ability to expand the number of menu items is shown in every currently displayed menu item such as softkey 121, and menu items 131 and 141. The embodiment of FIG. 1 shows such expansion capability to the programmer by displaying a position for one next available key. However, other methods may be employed such as placing an expansion marker or color on the menu or submenu items indicating to the developer that a menu expansion is possible.

Figure 2:
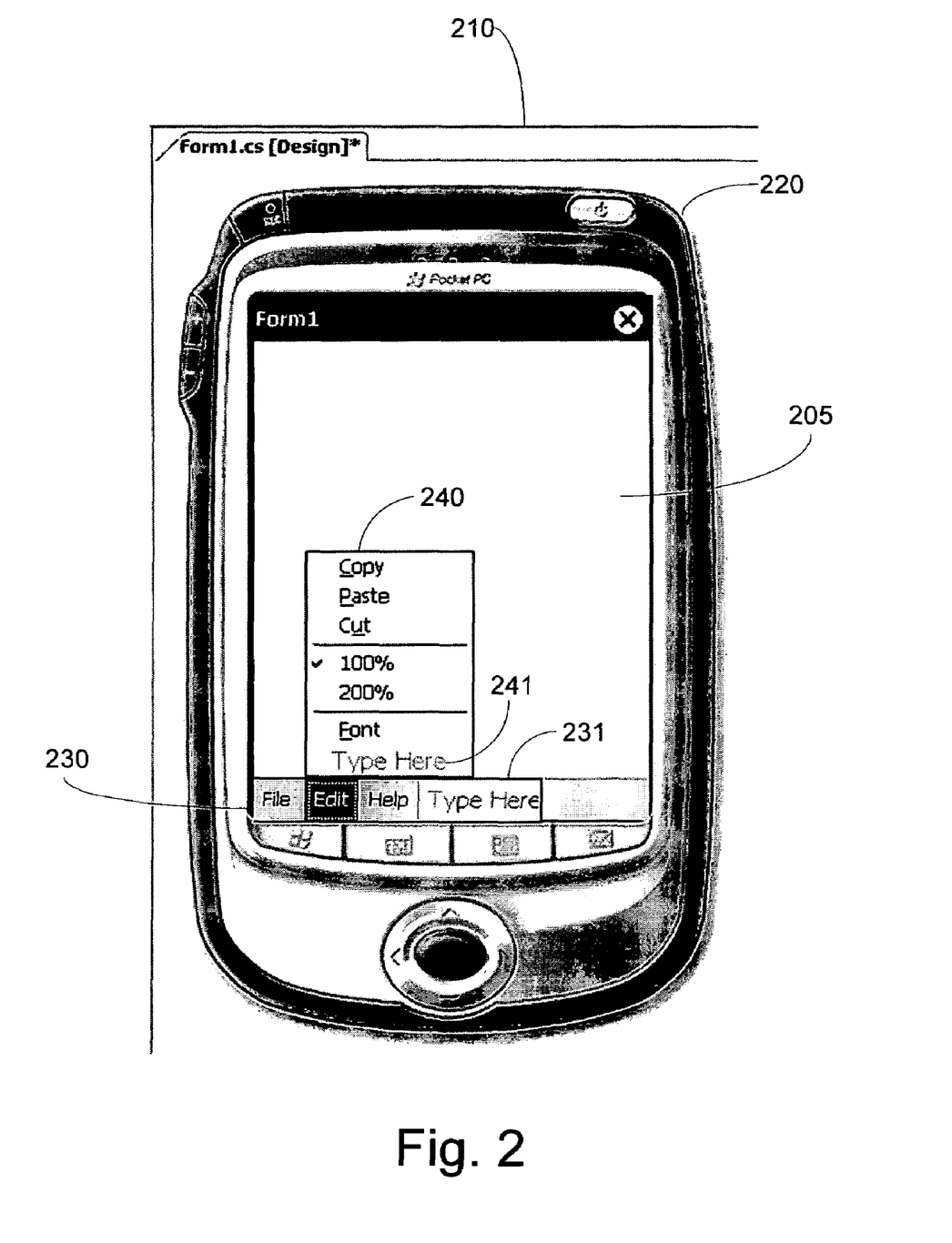
FIG. 2 is another exemplary screen shot showing aspects of the invention.

The functionality described in FIG. 1 is shown by example in FIG. 2. FIG. 2 depicts a pocket personal computer (PC) as shown on a development system screen shot 210. The pocket PC body 220 is displayed so that the developer may better appreciate the look and feel of the handheld device she is developing. In this embodiment, a main menu bar 230 is located at the bottom of the GUI interface 205 of the pocket PC device 220. The menu bar indicates that three softkeys are already defined as file, edit and help. A fourth softkey 231 is indicated as being available. The availability of the new softkey 231 is indicative of the ability of the pocket PC operating system to support an additional softkey.

In the example of FIG. 2, the developer has selected the edit softkey of the main menu bar 230 and a submenu item stack 240 is shown. Submenu item stack 240 displays an indication that six submenu functions have been defined by the programmer as follows: copy, paste, cut, 100%, 200% and font. A potential expansion of the submenu item stack 240 is possible by indication of a new menu item 241 in the submenu. The programmer can take advantage of either the main menu softkey 231 or the submenu item 241 in developing a new application capability.

Figure 3:
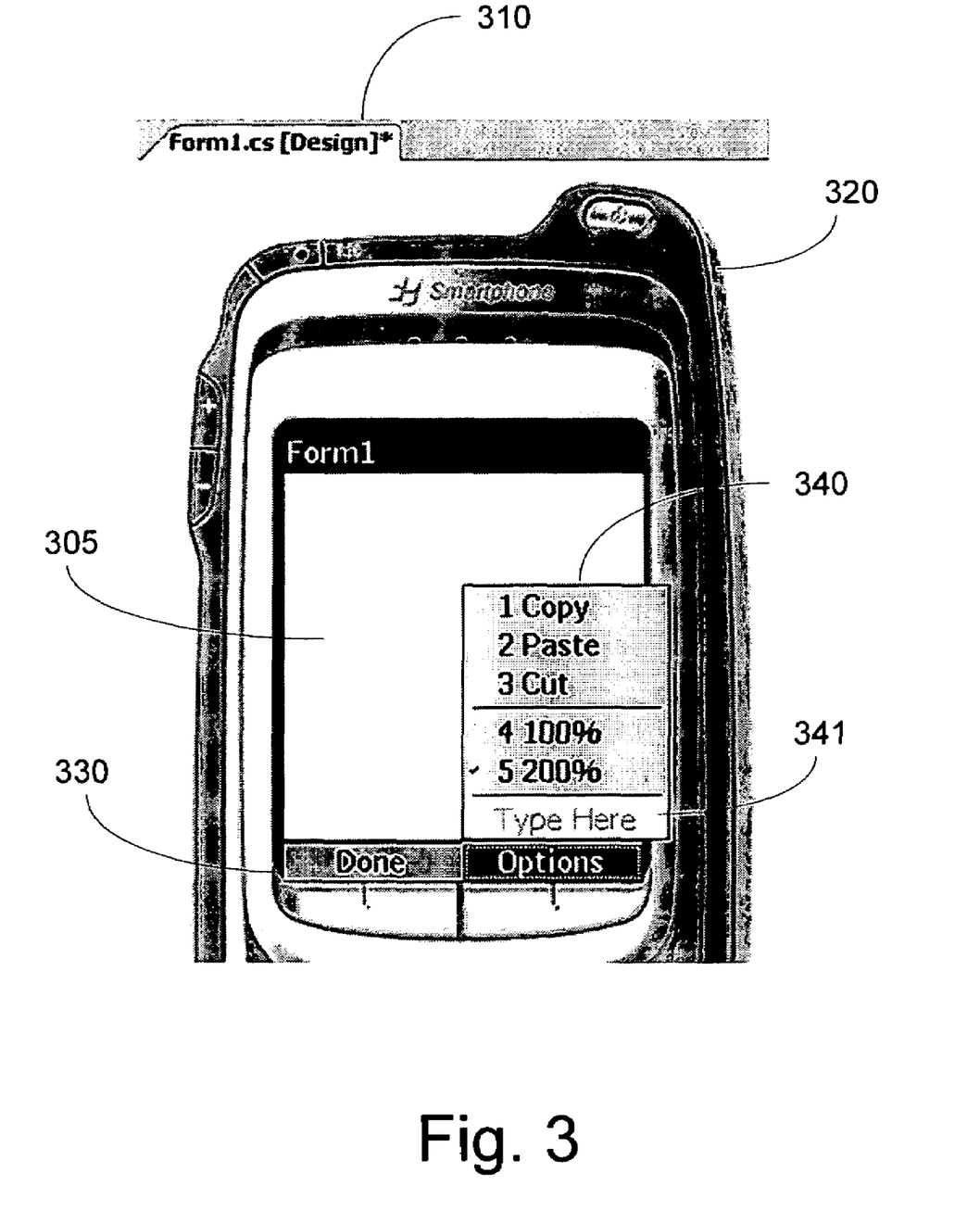
FIG. 3 is another exemplary screen shot showing aspects of the invention.

FIG. 3 is an example of a different device being developed according to aspects of the invention. FIG. 3 depicts a smart phone body 320 rendered on a development system screen display 310. The GUI display 305 has a menu bar 330 that indicates two softkeys labeled done and options. In this example, the operating system of the smart phone does not allow the addition of another softkey. Thus, no optional new key is available to the developer. This restriction is a reflection of the limitations of the operating system of the smart phone handheld device 320.

The display 310 indicates that the developer has activated the options menu softkey and a submenu stack 340 is displayed. In this example, the operating system does not have a limit on the expansion of the menu items in the submenu stack 340. Thus, a new sub menu item, 341 is available to the smart phone device developer.

Figure 4:
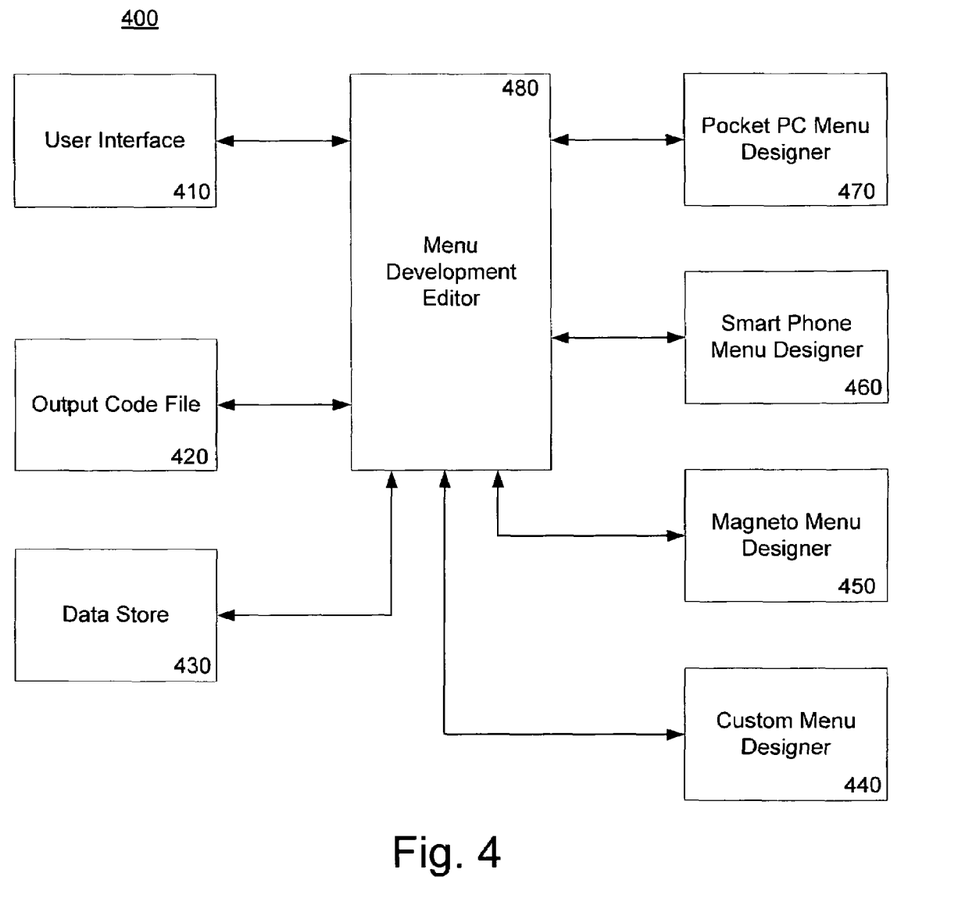
FIG. 4 is a functional block diagram.

FIG. 4 is a functional diagram 400 of software elements of a development system which use aspects of the invention. A user interface to the development system 410 may interact with a menu development editor 480. A developer may employ the user interface 410 to request a development session for a handheld device. The menu editor 480 can instantiate the selected user interface by accessing the selected menu designer. FIG. 4 depicts four different menu designers; pocket PC menu designer 470, smart phone menu designer 460, magneto menu designer 450 and a custom menu designer 440. The menu designer that is selected is dependent upon the user selection of a target handheld device.

The specific menu designer selected provides a corresponding device body and menu designer that interacts along with corresponding operating system limitations to render a realistic view of the device being developed. In one aspect of the embodiment, a data store 430 contains the selected device operating system and may be accessed by the menu editor 480. The data store may thus have a plurality of operating systems for a corresponding plurality of handheld devices to be developed.

The development editor 480 contains methods for menu development which are common to the development of menus. It is the specific menu designers 440, 450, 460 and 470, targeted to specific handheld devices, which are used to customize the interface and functionality of the menus of the target device. The various designers essentially allow customization of the menu editor for the selected target device. This customization occurs along with an exercise of the relevant portion of the corresponding device operating system in order to allow menu element creation that can function within the performance limits of the selected device.

Consequently, the present invention is extensible such that any new operating system for a selected handheld device may be used in conjunction with the menu editor 480 so that new applications can be generated for a device even if a new version of an operating system for that device is being used. Thus, not only application developers can use the present invention, but a more sophisticated developer can use the present invention to develop and test new applications on a new operating system which may still be under development.

After the menu editor has access to both the relevant device designer and the relevant handheld device operating system in the data store 430, then interactions with the user via the user interface 410 allow the user to customize the menus for the target handheld device. As menus are generated, the development system renders a display indicative of what the operating system of the selected device should show on the device GUI and the programmed functionality of the softkeys that are created or modified. When the developer is satisfied with one part of this development, she may save the newly created or modified device menu and object code is generated and stored in an output code file 420. At this point, useable target operating system object code is generated specifically for the target device. This code is considered more useable than from prior art development systems because the code was developed by using the operating system of the target handheld device to display the look and feel of the developed menu and functionality during the development process.

An additional aspect of the invention allows an "on the fly" change of menu items from one device to the next. For example, if the menu editor 480 were used by a developer on a first device type, the user need not fully restart development of the definition and functionality of the new menu for a new device. The developer may bring up the desired menu development from an existing design in a first device, change the definition of the target device, and the menu editor 480 can morph the menu design to a second target device. Naturally, the new menu on the new target device must be compatible in capability to the second target device to be fully functional. But this porting of a menu design form one device type to another can save development definition time and standardize menus across a family of devices.

Figure 5:
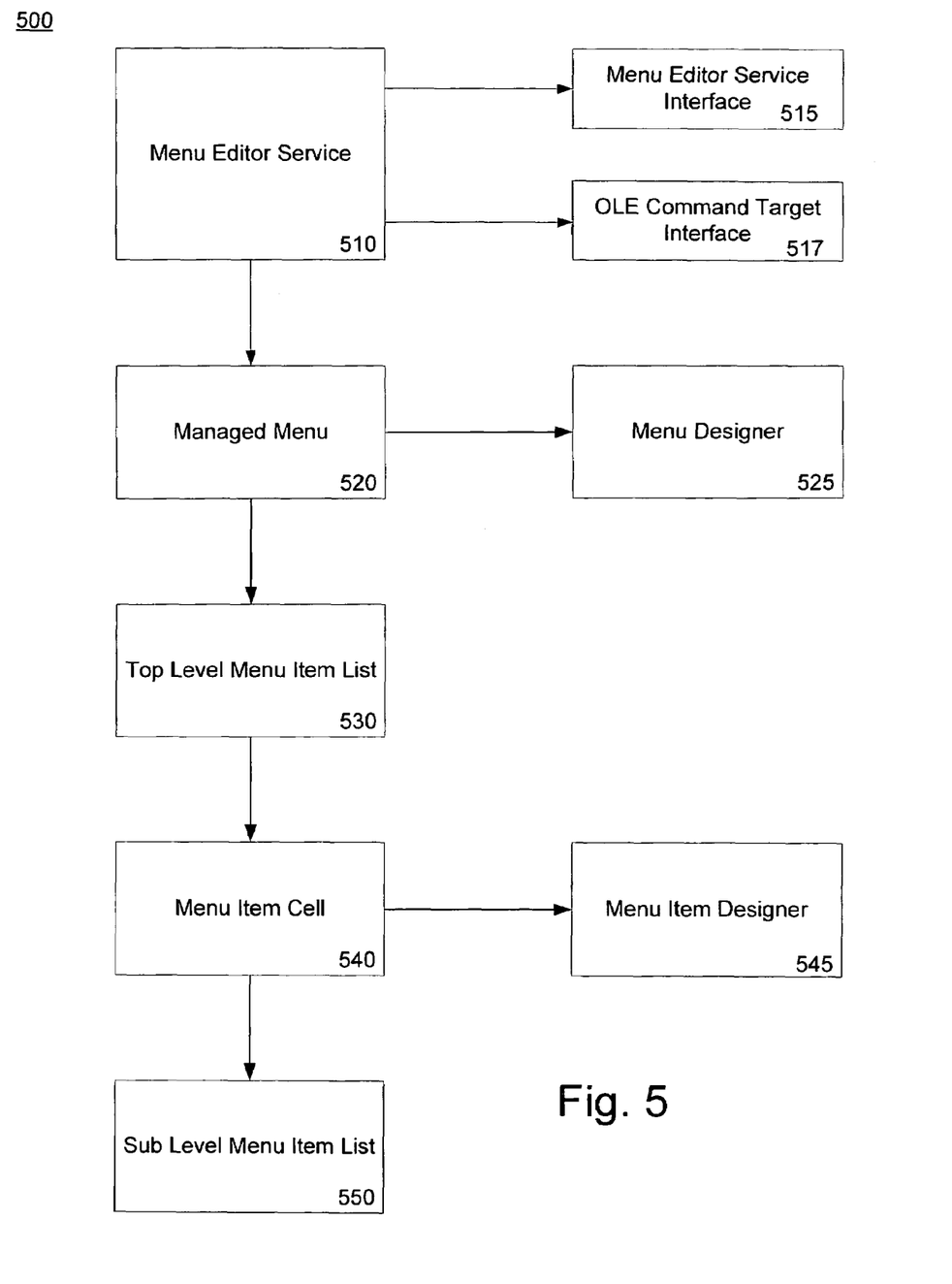
FIG. 5 is an exemplary class structure diagram.

FIG. 5 depicts the software component classes in the menu editor 480. The menu editor service 510 acts as the bridge between menu editor and its environment. One menu editor service 510 instance exists per every root component. The managed menu 520 represents the design time development user interface for menu objects. The managed menu class 520 controls the overall menu editor behavior and manages a user interface of a single menu editor. If a handheld device form has X number of menus, it will have X number of managed menu 520 objects. The menu editor service 510 controls which of the managed menus 520 is visible to the user. The managed menu class 520 accesses the menu designer class 525 and provides design time support for menus.

Every instance of a managed menu 520 has a top level menu item list 530, which represents the top level menu bar user interface. This corresponds to the top level control for item 120 of FIG. 1. The top level list handles the top level menu item list 530 and contains menu item cell 540, which represents the menu item's user interface of item 130 of FIG. 1. Menu item cell 540 represents the user interface of a menu item. It is managed by sub level menu item list and top level menu item list.

The menu item cell class 540 accesses the menu item designer class 545 and provides design time support for menu items. The menu item cell class 540 can have sub level menu item list 550 if its menu items property contains submenus. A sub-list is shown in FIG. 1 as item 140. In this case, sub-list is represented by a menu item list. The sub level menu item list 550 and top level menu item list 530 handles sub-list selection and adding/removing menu items.

The menu editor service class 510 implements Menu Editor Service Interface 515 and Ole Command Target Interface 517. The Menu Editor Service Interface 515 is used to control when to launch, display and hide menu editor. The Ole Command Target Interface 517 is used to communicate with a Visual Studio™ shell command operations, such as copy/paste/cut/delete. Visual Studio™ is available from Microsoft® Corporation in Redmond, Wash.

Figure 6:
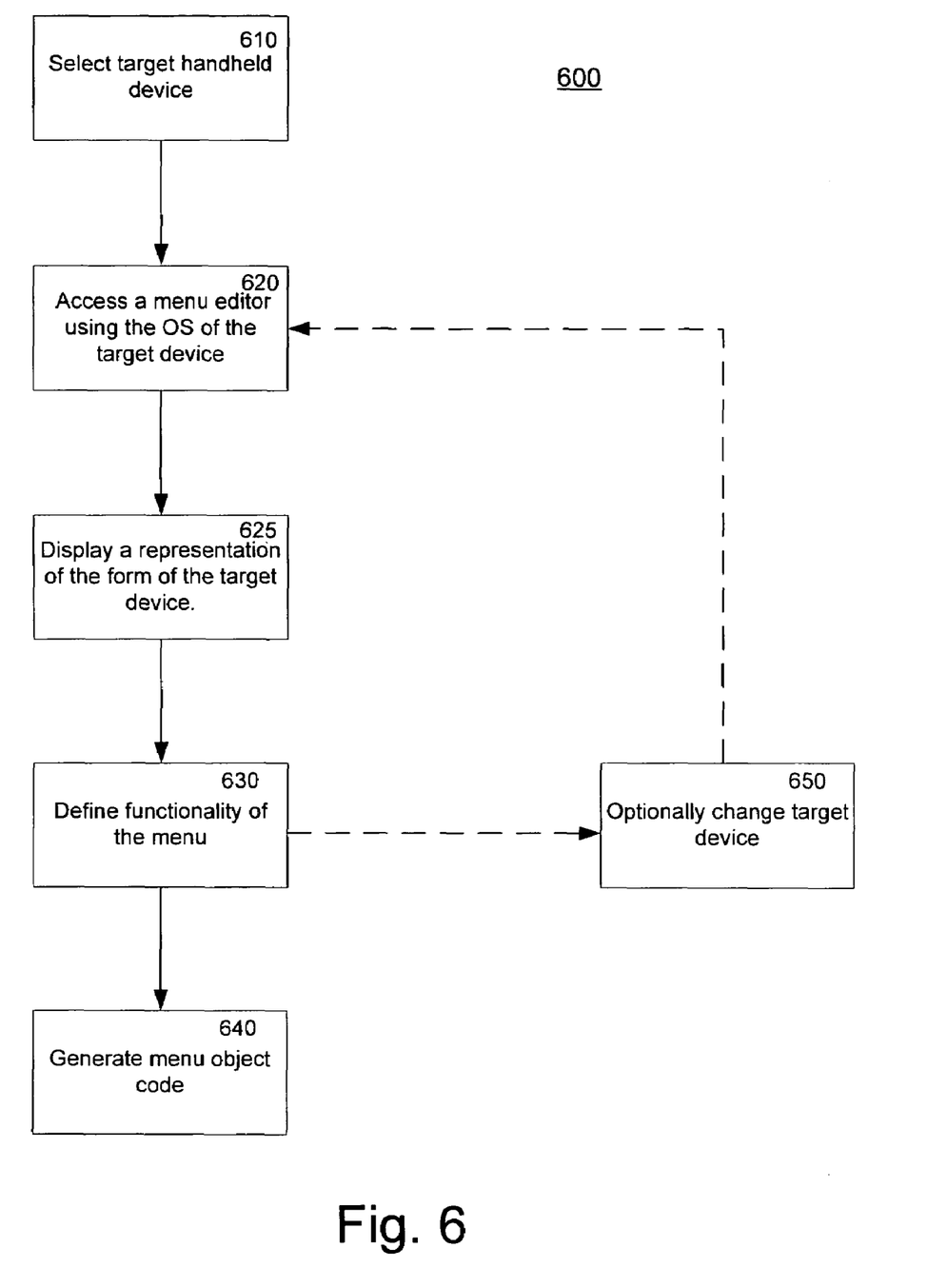
FIG. 6 is a flow diagram for an exemplary method of the invention.

FIG. 6 represents a flow diagram of an example method using aspects of the invention. The method 600 may begin by selecting a target handheld device (step 610) on a development system used for the development of menus for digital devices. The system preferably has a plurality of target devices that can be selected such as a compact PC, a smart phone, a personal digital assistant, a digital planner or any other type of handheld device that uses a display for operation.

Once the targeted device is selected, the development system may access a menu editor for the selected device. According to an aspect of the invention, the menu editor has access to the operating system of the targeted device. This operating system is useful to emulate the target device response to a new menu program or application that the developer is creating. The display of an image form representative of the target device shown the device graphical display is rendered (step 625) by the development system. This image form display helps the developer appreciate the look and feel of the target device and its interaction with a device user. The developer can use the menu editor to define a new menu and the corresponding functionality (step 630). In one embodiment, the new menu may be a softkey. According to an aspect of the invention, the menu editor allows the developer to see how the new menu will look and operate on the target device because the operating system is available to emulate the actual constraints of the target device operating system.

After the menu operation is defined, possibly as a softkey or menu item, then the developer may request that target device code be generated (step 640). This may be performed automatically by the development system software or it may be requested by the developer by initiated by actuating a save function. Code representing the newly developed menu function is serialized or generated to be in full compatibility with the specific operating system of the targeted handheld digital device. Because the specific target operating system was used during the development process, no unexpected code behavior is expected.

In one aspect of the invention, a new menu function targeted to one device may be used in another device. Optional step 650 may be taken after a definition of a menu function for a specific device. The developer may change the target handheld device after a new menu function is defined without loss of menu definition. The method 600 allows the new menu definition to be preserved while access to the specific target device editor is being changed. The preserved menu may be used in the newly re-defined target device and new softkeys and menu items may be developed.

Exemplary Computing Device

Figure 7:
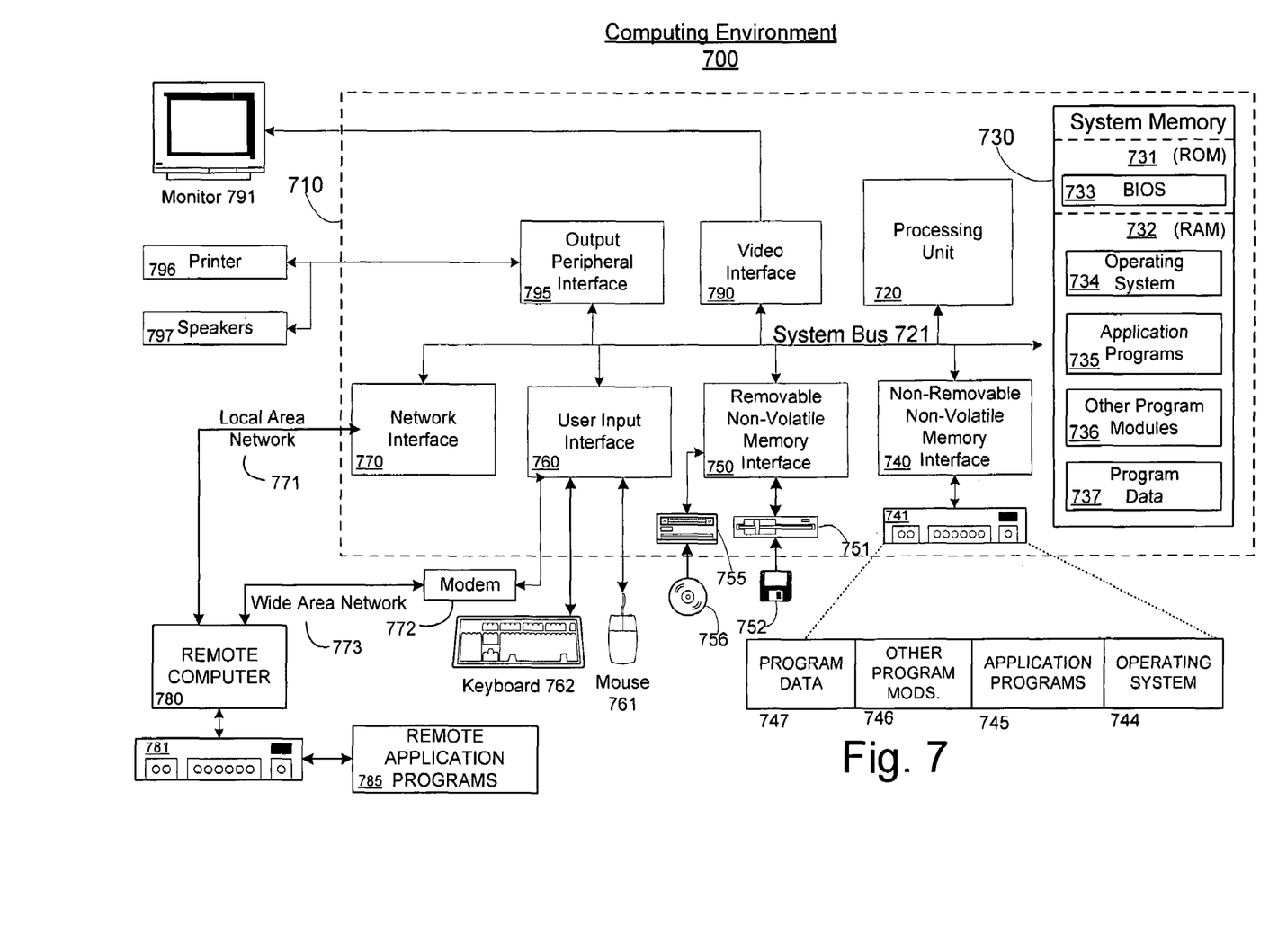
FIG. 7 is a block diagram showing an exemplary computing environment in which aspects of the invention may be implemented.

FIG. 7 and the following discussion are intended to provide a brief general description of a suitable computing environment in which embodiments of the invention may be implemented. While a general purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 7 thus illustrates an example of a suitable computing system environment 700 in which the embodiments of the invention may be implemented, although as made clear above, the computing system environment 700 is only one example of a suitable computing environment and is not intended to suggest any limitation as to the scope of use or functionality of an embodiment of the invention. Neither should the computing environment 700 be interpreted as having any dependency or requirement relating to any one or combination of components illustrated in the exemplary operating environment 700.

With reference to FIG. 7, an exemplary system for implementing an embodiment of the invention includes a general purpose computing device in the form of a computer system 710. Components of computer system 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 710 typically includes a variety of computer readable media. Computer readable media can be any available media that can be accessed by computer system 710 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer system 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer system 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7 provide storage of computer readable instructions, data structures, program modules and other data for the computer system 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer system 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus 721, but may be connected by other interface and bus structures, such as a parallel port, game port or a universal serial bus (USB). A monitor 791 or other type of display device is also connected to the system bus 721 via an interface, such as a video interface 790, which may in turn communicate with video memory (not shown). In addition to monitor 791, computer systems may also include other peripheral output devices such as speakers 797 and printer 796, which may be connected through an output peripheral interface 795.

The computer system 710 may operate in a networked or distributed environment using logical connections to one or more remote computers, such as a remote computer 780. The remote computer 780 may be a personal computer, a server, a router, a network PC, a peer device or other common network node, and typically includes many or all of the elements described above relative to the computer system 710, although only a memory storage device 781 has been illustrated in FIG. 7. The logical connections depicted in FIG. 7 include a local area network (LAN) 771 and a wide area network (WAN) 773, but may also include other networks/buses. Such networking environments are commonplace in homes, offices, enterprise-wide computer networks, intranets and the Internet.

When used in a LAN networking environment, the computer system 710 is connected to the LAN 771 through a network interface or adapter 770. When used in a WAN networking environment, the computer system 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer system 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement an editor for a digital device. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed is:

1. A method of creating an application control for a handheld digital device in a software development environment, the method comprising:
   selecting a first target handheld device from a plurality of target handheld devices, the selected target handheld device having an associated operating system available to the software development environment, wherein each of the plurality of target handheld devices has a respective operating system;
   accessing an editor for creation of the application control, the editor using constraints of the associated operating system;
   displaying a physical image form of the selected target handheld device such that a physical representation of the graphical interface of the selected target handheld device displays the application control;
   defining functionality for the application control being displayed on the graphical interface; and
   generating object code indicative of the application control, wherein the object code is compliant with the constraints of the associated operating system.

2. The method of claim 1, wherein selecting a first target device comprises selecting a first target device from a plurality of different target devices, each one of the plurality having an associated operating system.

3. The method of claim 1, wherein the first target device is a digital device having a custom operating system.

4. The method of claim 1, further comprising:
   selecting a second target device after defining functionality for the application control and before generating object code, wherein the object code generated is indicative of the application control of the second target device instead of the first target device.

5. The method of claim 1, wherein accessing an editor for creation of the application control comprises instantiating a user interface for creation of a menu function on the first target device.

6. The method of claim 5, wherein the first target device is one of a pocket personal computer, a smart phone and a personal digital assistant.

7. A computer system for the software development of an application control for a handheld digital device, the system comprising:
   a display for viewing a target handheld device application control;
   a memory store, having at least one target handheld device operating system, wherein the memory store comprises one or more of multiple target operating systems for handheld digital devices and a custom handheld digital device target operating system;
   a processor, having access to computer memory having instructions, the instructions, when executed, performing a method comprising:
   selecting a first target handheld device, the selected target handheld device having an associated target handheld device operating system;
   accessing an editor for creation of the application control, the editor using constraints of the target handheld device associated operating system;
   displaying a physical image form of the selected target handheld device such that a physical representation of the graphical interface of the selected target handheld device displays the application control; defining functionality for the application control; and
   generating object code indicative of the application control, wherein the object code is compliant with the constraints of the associated operating system.

8. The system of claim 7, wherein the display renders a depiction of the selected first target device and the application control as seen by a user of the first target device.

9. The system of claim 7, wherein the associated operating system is distinct from the development operating system.

10. A computer-readable storage medium having computer-executable instructions for performing a method for a method of creating an application control for a handheld digital device in a software development environment, the method comprising:
    selecting a first target handheld device from a plurality of different target handheld devices, each one of the plurality of different handheld devices having a specified associated operating system, the selected target handheld device having an associated operating system available to the software development environment;
    accessing an editor for creation of the application control, the editor using constraints of the associated operating system;
    displaying a physical image form of the selected target handheld device such that a physical representation of the graphical interface of the selected target handheld device displays the application control;
    defining functionality for the application control; and generating object code indicative of the application control, wherein the object code is compliant with the constraints of the associated operating system.

11. The computer-readable medium of claim 10, further comprising the step of:
    selecting a second target device after defining functionality for the application control and before generating object code, wherein the object code generated is indicative of the application control of the second target device instead of the first target device.

12. The computer-readable medium of claim 10, wherein the step of accessing an editor for creation of the application control comprises instantiating a user interface for creation of a menu function on the first target device.

13. The computer-readable medium of claim 12, wherein the first target device is one of a pocket personal computer, a smart phone and a personal digital assistant.

* * * * *